March 27, 1956  W. R. CARTER  2,739,389
CONCENTRICITY GAGE
Filed July 14, 1953  2 Sheets-Sheet 2
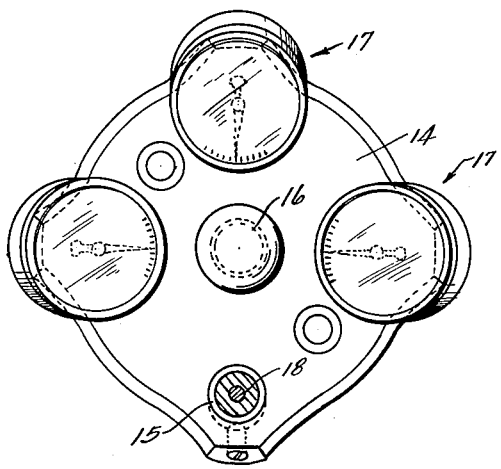
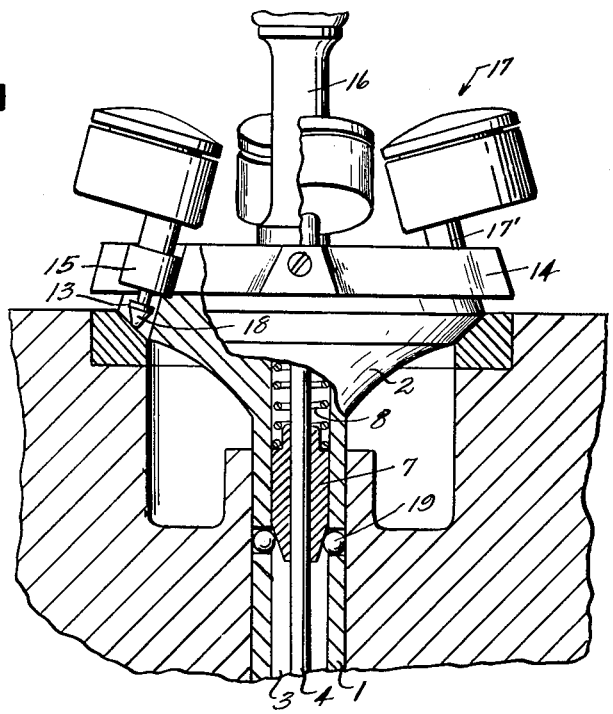
INVENTOR.
WILLIAM R. CARTER
BY
ATTORNEYS United States Patent Office 2,739,389
Patented Mar. 27, 1956

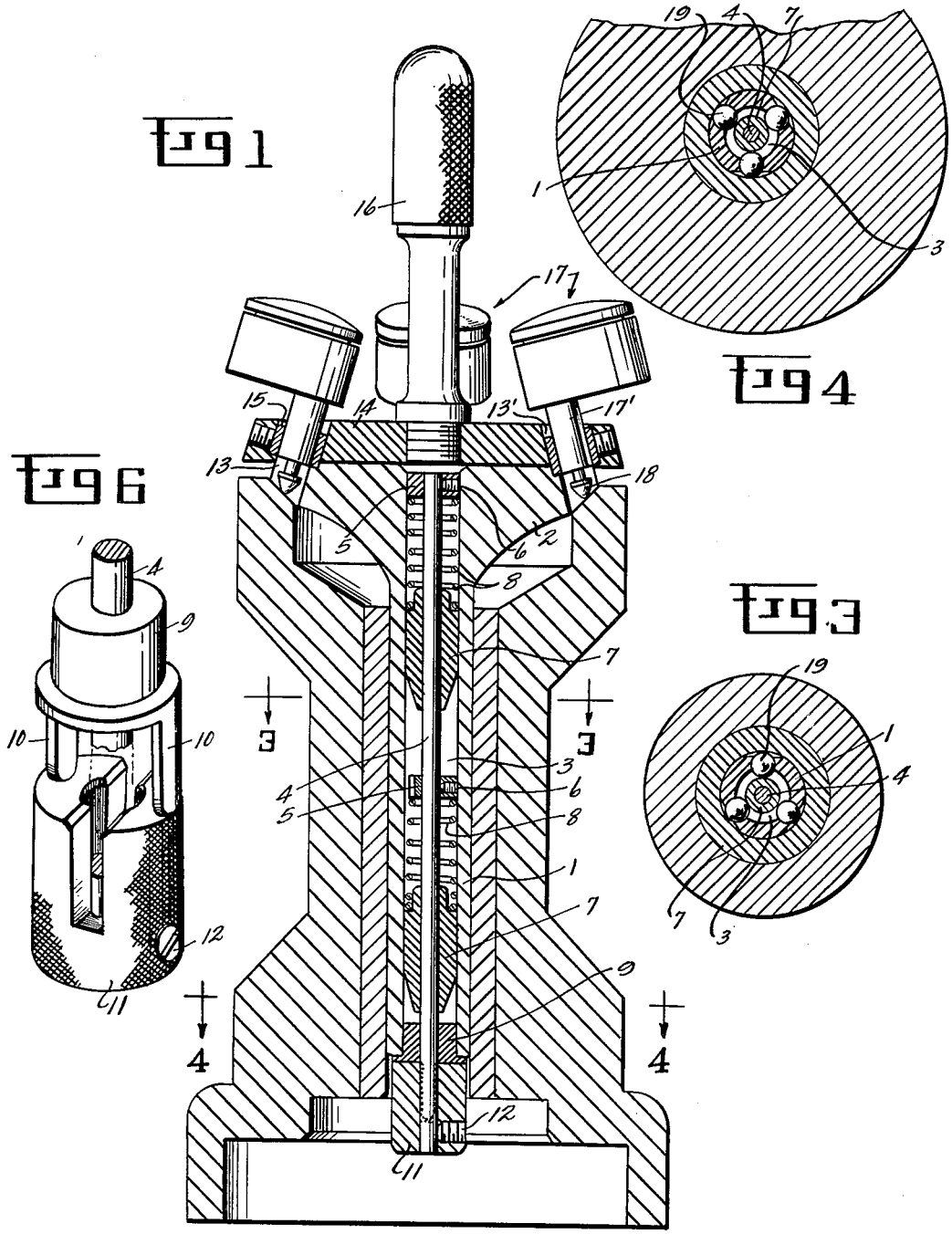

2,739,389

CONCENTRICITY GAGE

William R. Carter, San Antonio, Tex.

Application July 14, 1953, Serial No. 368,019

6 Claims. (Cl. 33—174)

(Granted under Title 35, U. S. Code (1952), sec. 266)

The invention described herein may be manufactured and used by or for the Government for governmental purposes without payment to me of any royalty thereon.

This invention is directed to an improved concentricity gage for checking valve seats to determine whether a seat is concentric with the valve stem guide associated therewith. This concentricity is exceedingly important, particularly in aircraft engines, to insure proper performance. Prior gages utilized to check concentricity or valve seats are very unwieldy and lend themselves to inaccuracies due to a generally complex structure providing indirect transmission from the valve seat to a single indicator which is rotated 360° with the gage unit; whereas a simple direction transmission is provided in applicant's improved gage unit. The very nature of the prior type of gage lends itself to inaccuracies resulting both from construction and the human element involved. The improved gage which is the subject of this invention was developed to obtain a more accurate, simplified checking unit which could provide adequate and rapid checking of valve guides and seats. The improved gage enables a simple and quick application with an immediate determination of concentricity or lack of it. The gage consists of a simulated valve pilot stem adapted to be inserted in a valve guide of the unit being checked and the stem is inclusive of a spring biased means for centering the stem within the valve guide. A cap fixed to the stem head has four indicators extending therethrough in equally circumferentially spaced relation. The indicators include plunger units which transmit to the indicator and such plungers extend through openings in the head of the pilot stem to engage the valve seat which is being checked. Before application the indicators are referenced in a master jig and on subsequent application to check a seat with respect to a valve guide serve to provide an immediate symmetrical four point contact of the valve seat at 90° intervals and an immediate indication of any deviation from true concentricity will be readily apparent. The gage, of course, is arranged to be rotatable with respect to the valve guide where required.

An object of this invention is to provide an improved gage unit for checking valve seats to determine whether the valve seat is concentric with the valve guide.

A further object of this invention is to provide a highly simplified concentricity gage.

Other objects and advantages of the invention will be readily apparent from the following specification taken in conjunction with the accompanying drawings wherein:

Fig. 1 shows a cross section of the novel gage unit as applied to a master jig incorporating a valve guide unit for referencing the indicators on the gage unit.

Fig. 2 is a top view of the gage unit showing the positioning of the four indicators.

Fig. 3 is a cross sectional view taken along line 3—3 of Fig. 1.

Fig. 4 is a cross sectional view taken along line 4—4 of Fig. 1.

Fig. 5 is a partial fragmentary sectional view showing the gage unit as applied to a valve seat in an engine.

Fig. 6 is a fractional view showing the tensioning means for centering the gage unit in a valve guide.

As shown in Fig. 1 of the drawings the gage unit comprises a pilot stem 1 having a simulated valve head 2 and an opening 3 centrally and longitudinally thereof concentrically located therein. A rod 4 concentric within the opening has a collar 5 secured to one end thereof by a set screw 6. A second collar 5' is fixed to the rod 4 intermediate its length as shown in Fig. 1 by a set screw 6'. Cone members 7 are arranged on said rod in respectively spaced relation below the respective collar member 5 and 5' and in slidable relation with respect to said rod. Coil springs 8 are interposed between the respective collars and cone members tending to bias the cone members downwardly of the stem as seen in Fig. 1 of the drawings. On the lower end of the rod 4 is located a cylindrical member 9 pressed into the opening 3 and having a flange abutting the lower end of the stem having diametrically opposed tongue members 10 depending therefrom. To the end of the rod 4 is connected a clevis member 11 normally abutting the flange on member 9 and having recessed portions to normally receive the tongue members on cylindrical member 9. A set screw 12 secures the clevis member to the rod. The clevis member is shown in Fig. 1 in untensioned position of the rod member.

Arranged circumferentially of the head 2 of the stem are four openings 13 arranged in inclined fashion therethrough at 90° intervals. Secured to the upper surface of the head by screw elements is a cover element 14 having four mating openings 13' in inclined fashion therein. Each of these openings has a bushing 15 fixed therein. The respective bushings are secured within the cover in the predetermined position by set screws as shown. In threaded engagement with a central opening in the cover member is a handle 16. Fixed within each bushing is a plunger guide element 17' of an indicator unit 17. In the assembled relation of the cover to the stem head the plunger elements 18 of the indicator extend from the guide elements fixed to the cover through the openings in the head 2 of the stem. Located immediately adjacent the conical end of each cone member in the stem are three ball members 19 in a single plane as shown in Figs. 3 and 4 of the drawings and in circumferentially equally spaced relationship. The rod 4 and its assembled elements including the cone members are normally placed or arranged so the ball members are interposed to engage the cone members to prevent downward movement of the rod within the stem.

As can be readily seen from Fig. 5 of the drawings, in use the gage pilot stem is dropped into a valve guide so that the head portion with its bevel section mates with the valve seat associated with the valve guide structure, the gage indicators having been previously referenced on a master gage to give the indication of the predetermined reading required to indicate true concentricity. In the event there is a lack of concentricity the equally spaced circumferentially arranged indicators will immediately show a deviation at one instance or another so that the element may be rejected without further handling. The gage need be turned only through 90° to provide a complete check. The combination of the clevis member and the tongue members provide a means to maintain the rod and pilot stem in the predetermined centered relation to the valve guide by means of the ball members 19 being biased outwardly against the valve guide. To bias the balls outwardly the clevis member with connected rod is pulled down against the coil spring tension so as to disengage the clevis member from the tongue members of member 9 and turned 90° so as to have the contiguous surface of the clevis member abut against the tongue elements extremities as shown in Fig. 6 of the drawings to bias the cone members down against the ball members to bias them outwardly against the valve guide.

As can be readily seen there has been provided a highly simple and efficient unit for checking concentricity, easily applicable, accordingly reducing the time involved and increasing the accuracy of the checking.

It is noted that the invention is adaptable to many applications and while a single practical embodiment and application of the invention has been specifically disclosed herein nothing is intended to limit the scope of the invention as defined by the following claims.

What I claim is:

1. A concentricity gage for checking valve seats to determine concentricity with respect to associated valve guides comprising a pilot stem adapted to be inserted in the valve guide, means associated with the stem to positively locate said stem in predetermined relation with respect to the valve guide, a head on said stem adapted to seat on the valve seat and having openings therethrough in equally circumferentially spaced relation, indicators mounted on said head in fixed relation with respect to said openings and having indicator elements extending through said openings and movable relative thereto to contact the valve seat which is engaged by said head and to be biased thereby, whereby the relative readings on the indicators are effected by said bias and may provide an immediate indication of lack of concentricity.

2. A gage for use in inspecting valve guide structure comprising a pilot stem for insertion in a valve stem guide means, means to fix said stem relative to the guide means, a head on said stem adapted to seat on the valve seat associated with the valve stem guide means and having openings therethrough to the valve seat on which it is seated, indicating means mounted in said head openings and having biased plunger elements extending to engage the valve seat on which the head is seated and be biased thereby to provide indication of irregularities therein with respect to the valve guide means.

3. The structure as set forth in claim 2, said openings being arranged in equally spaced relation about the head for alignment with the valve seat to which the head is applied.

4. A concentricity gage for checking the concentricity of valve seats with respect to valve guides comprising, a hollow pilot stem, a rod substantially concentric within said stem, biasing means arranged on said rod, means associated with said rod biasing means and said pilot stem to prevent movement of the rod in one direction, means mounted on said rod to bias the rod in said one direction in opposition to said means associated with the rod biasing means and said pilot stem to center the pilot stem in a valve guide, a head on said stem to seat on the valve seat associated with the valve guide, and indicator means mounted on said head in equal circumferentially spaced relation, biased fingers extending from said indicator means through said head whereby on seating the gage, the fingers will be biased by the valve seat to provide the relative readings on the indicators which will indicate the degree of concentricity of the valve seat with respect to the valve guide.

5. The structure as set forth in claim 4 wherein the indicator means are mounted on said head at 90° intervals in inclined relation with respect to said head.

6. A concentricity gage for checking the concentricity of valve seats relative to valve guides comprising a hollow pilot stem, a head on said stem to seat on a valve seat, indicator means mounted on said head in equal circumferentially spaced relation having biased fingers extending therethrough, a rod concentrically located within said stem having a first stop means secured thereto at one end thereof in slidable engagement with said stem, a second stop means secured to said rod in spaced relation to said first stop means, conical biasing members on said rod spaced from each of said stop members, spring biasing elements interposed between said conical members and their respective stop members, ball members in spaced relation in the stem wall arranged adjacent the conical members and means connected to the other end of said rod and adjustable with said rod relative to said stem to bias the conical members against the ball members through said stop members to center the gage relative to the valve guide whereby on seating the gage in centered relation relative to said valve guide, said fingers will be biased by the valve seat to provide relative readings on the indicators whereby the degree of concentricity of the valve seat relative to the valve guide may be readily determined.

References Cited in the file of this patent

UNITED STATES PATENTS

| | | |
|---|---|---|
| 1,996,092 | Albertson | Apr. 2, 1935 |
| 2,544,609 | McMahan | Mar. 6, 1951 |
| 2,553,129 | Burnett | May 15, 1951 |
| 2,687,575 | Acton | Aug. 31, 1954 |

OTHER REFERENCES

American Machinist, p. 695, October 25, 1933.